(12) United States Patent
Yoshioka et al.

(10) Patent No.: US 10,703,616 B2
(45) Date of Patent: Jul. 7, 2020

(54) BATTERY ELECTRIC COUNTERBALANCED FORKLIFT

(71) Applicant: Mitsubishi Logisnext Co., Ltd., Kyoto (JP)

(72) Inventors: Masahiro Yoshioka, Kyoto (JP); Makoto Torikawa, Kyoto (JP)

(73) Assignee: MITSUBISHI LOGISNEXT CO., LTD., Kyoto (JP)

( * ) Notice: Subject to any disclaimer, the term of this patent is extended or adjusted under 35 U.S.C. 154(b) by 0 days.

(21) Appl. No.: 16/371,158

(22) Filed: Apr. 1, 2019

(65) Prior Publication Data
US 2019/0308859 A1 Oct. 10, 2019

(30) Foreign Application Priority Data
Apr. 10, 2018 (JP) .................... 2018-075174

(51) Int. Cl.
*B66F 9/075* (2006.01)
*B60K 1/04* (2019.01)
*B60L 50/60* (2019.01)

(52) U.S. Cl.
CPC ............ *B66F 9/07554* (2013.01); *B60K 1/04* (2013.01); *B60L 50/60* (2019.02); *B66F 9/07513* (2013.01); *B60Y 2200/15* (2013.01)

(58) Field of Classification Search
CPC .............. B66F 9/07554; B66F 9/07513; B66F 9/07527; B66F 9/07531; B60Y 2200/15; B60Y 220/15; B60L 50/62; B60L 50/66; B60L 50/64; B60L 50/50; B60L 50/60; B60K 1/04

USPC ................................................. 180/65.1, 68.5
See application file for complete search history.

(56) References Cited

U.S. PATENT DOCUMENTS

| 4,359,121 A * | 11/1982 | Messner ................. B60K 1/04 180/69.21 |
| 8,789,636 B2 * | 7/2014 | Nishiyama ............ B66F 9/0754 180/68.5 |
| 2010/0182750 A1 * | 7/2010 | Ehama .................. B60K 11/06 361/697 |

FOREIGN PATENT DOCUMENTS

| JP | H06-32468 | | 8/1994 | |
| JP | 11236193 A | * | 8/1999 | .......... B66F 9/07527 |
| JP | 2000327283 A | * | 11/2000 | .......... B66F 9/07527 |

* cited by examiner

*Primary Examiner* — John D Walters
(74) *Attorney, Agent, or Firm* — Kirschstein, Israel, Schiffmiller & Pieroni (57) ABSTRACT

A battery electric counterbalanced forklift reliably prevents rainwater from entering an electrical part compartment in a counterweight and also allows a battery cover attachment task to be performed more readily than conventionally. The forklift includes a body frame forming a battery compartment within a vehicle body, an openable battery cover closing the battery compartment, a counterweight disposed adjacently behind the body frame, a hinge rotatably joining the body frame and the battery cover, and an inner cover disposed so as to extend widthwise beyond a boundary between the body frame and the counterweight. The inner cover and the hinge are fastened together to the body frame at a portion forming the boundary.

3 Claims, 10 Drawing Sheets

BATTERY ELECTRIC COUNTERBALANCED FORKLIFT

TECHNICAL FIELD

The present invention relates to a battery electric counterbalanced forklift including forks and a mast, which are disposed in front of a vehicle body, as well as a counterweight disposed behind the vehicle body.

BACKGROUND ART

Typically, a battery electric counterbalanced forklift includes forks and a mast for raising and lowering the forks, both of which are disposed in front of a vehicle body, and also includes a counterweight disposed behind the vehicle body, a battery compartment provided within the vehicle body, an openable battery cover closing the compartment, and a seat disposed on the cover. Moreover, it is often the case that the counterweight has an electrical part compartment, which is open on the vehicle body side.

This type of forklift often has a problem in that when the battery cover is flipped up backward for maintaining the battery accommodated in the battery compartment, rainwater pooled on the cover flows to the counterweight and enters the electrical part compartment through a boundary portion between the vehicle body and the counterweight, thereby adversely affecting electrical parts.

With regard to this problem, Patent Document 1 discloses that the center of rotation for flipping up the battery cover is set within a gutter member (leakage removal groove) extending in a left/right direction. In this configuration, when rainwater flows toward the counterweight, the gutter member receives and guides the rainwater to an appropriate drain outlet, thereby preventing the rainwater from entering the electrical part compartment.

PRIOR ART DOCUMENT

Patent Document

Patent Document 1: Japanese Examined Utility Model Publication No. H06-32468

DISCLOSURE OF THE INVENTION

Problems to be Solved by the Invention

However, the above conventional configuration has a problem in that attaching the battery cover so as to be able to be flipped up, for a narrow space within the gutter member, is not an easy task.

The present invention has been achieved under the above circumstances, with a problem thereof being to provide a battery electric counterbalanced forklift capable of reliably preventing rainwater from entering an electrical part compartment within a counterweight and allowing a battery cover attachment task to be performed more readily than conventionally.

Solution to the Problems

To solve the problem, the present invention provides a battery electric forklift including a vehicle body, a body frame forming a battery compartment within the vehicle body, an openable battery cover closing the battery compartment, a counterweight disposed adjacently behind the body frame, forks, and a mast for raising and lowering the forks, the forks and the mast being disposed in front of the vehicle body, the forklift further including a hinge rotatably joining the body frame and the battery cover, and an inner cover disposed so as to extend widthwise beyond a boundary between the body frame and the counterweight, wherein the inner cover and the hinge are fastened together to the body frame at a portion forming the boundary.

Note that the "body frame" includes some members simply separating the battery compartment from other components.

The battery electric forklift may be configured, for example, such that the counterweight has an electrical part compartment with an open front, either the body frame or the counterweight, or both, has a notch provided at the portion forming the boundary, the inner cover has an opening provided at a portion over the notch and a ridge at least partially surrounding the opening, and the notch allows communication between an interior space and an exterior space of the electrical part compartment.

Furthermore, the battery electric forklift may further include, for example, an internal electrical part disposed in the interior space of the electrical part compartment, an external electrical part disposed in the exterior space of the electrical part compartment, and a cable extending through the notch and electrically connecting the internal electrical part and the external electrical part.

Effect of the Invention

The present invention renders it possible to provide a battery electric counterbalanced forklift capable of reliably preventing rainwater from entering an electrical part compartment within a counterweight and allowing a battery cover attachment task to be performed more readily than conventionally.

MODE FOR CARRYING OUT THE INVENTION

An embodiment of a battery electric counterbalanced forklift (referred to below simply as a "forklift") according to the present invention will be described with reference to the accompanying drawings.

Figure 1:
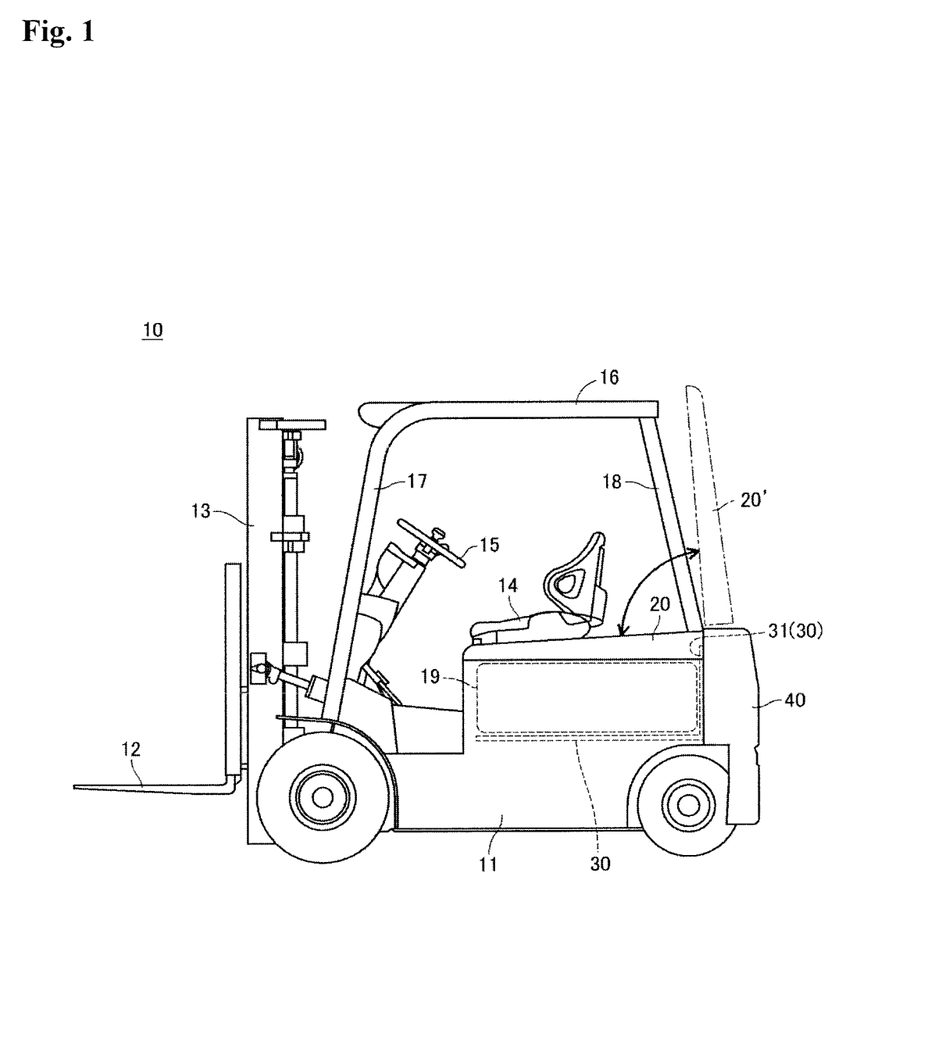
FIG. 1 is a side view illustrating a schematic configuration of a forklift according to an embodiment of the present invention.

FIG. 1 illustrates the forklift 10 according to the embodiment of the present invention. As shown in the figure, the forklift 10 includes a vehicle body 11, forks 12 and a mast 13 for raising and lowering the forks 12, both of which are disposed in front of the vehicle body 11, and also includes a counterweight 40 disposed behind the vehicle body 11, a seat 14 disposed above the vehicle body 11, controls such as a steering wheel 15, which are disposed in front of the seat 14, front and rear pillars 17 and 18, which extend upward from all four corners of the vehicle body 11, and an overhead guard 16 supported by the pillars 17 and 18.

Furthermore, the forklift 10 according to the present embodiment further includes a body frame 30 forming a battery compartment 19 within the vehicle body 11 and an openable battery cover 20 closing the battery compartment 19. The counterweight 40 described earlier is attached to a back surface of a weight attachment plate 31 included in the body frame 30. In other words, the counterweight 40 is disposed adjacently behind the body frame 30. Moreover, the seat 14 described earlier is disposed on the battery cover 20.

The battery cover 20 can also take the position denoted by the character 20'. When the battery cover 20 is in this position, the battery compartment 19 is open at the top, so that battery maintenance is possible.

Figure 2:
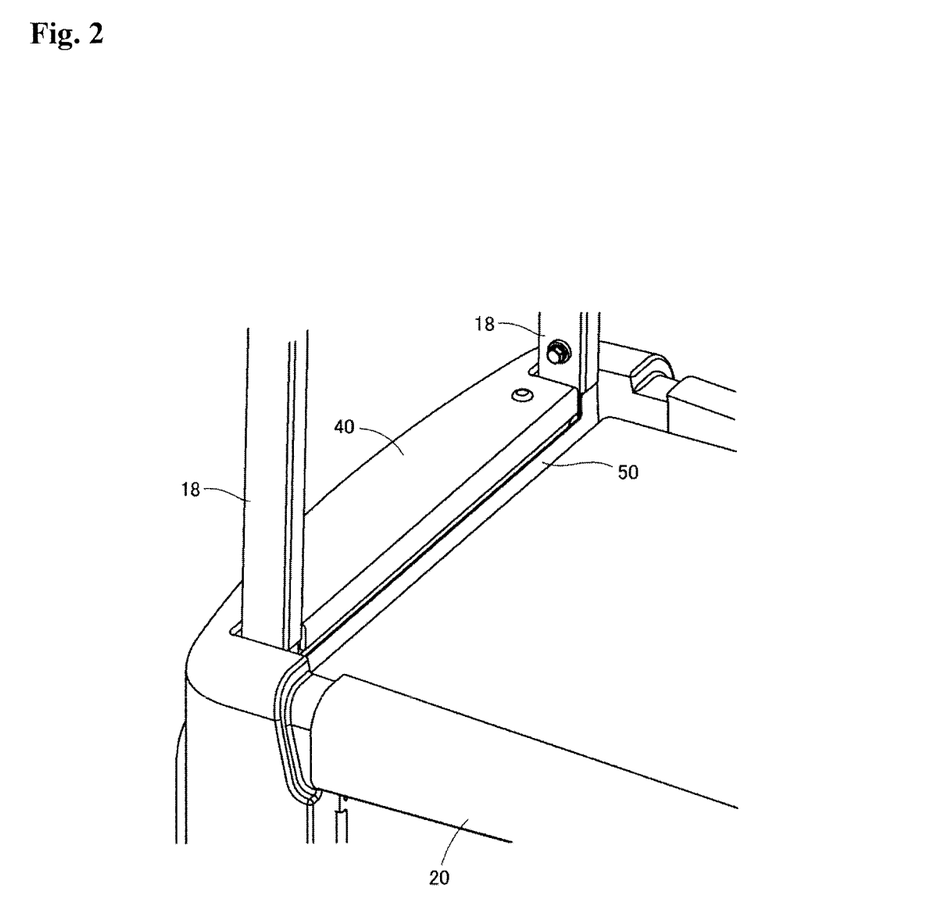
FIG. 2 is an oblique view illustrating a boundary portion between a vehicle body and a counterweight in the forklift according to the embodiment.
Figure 3:
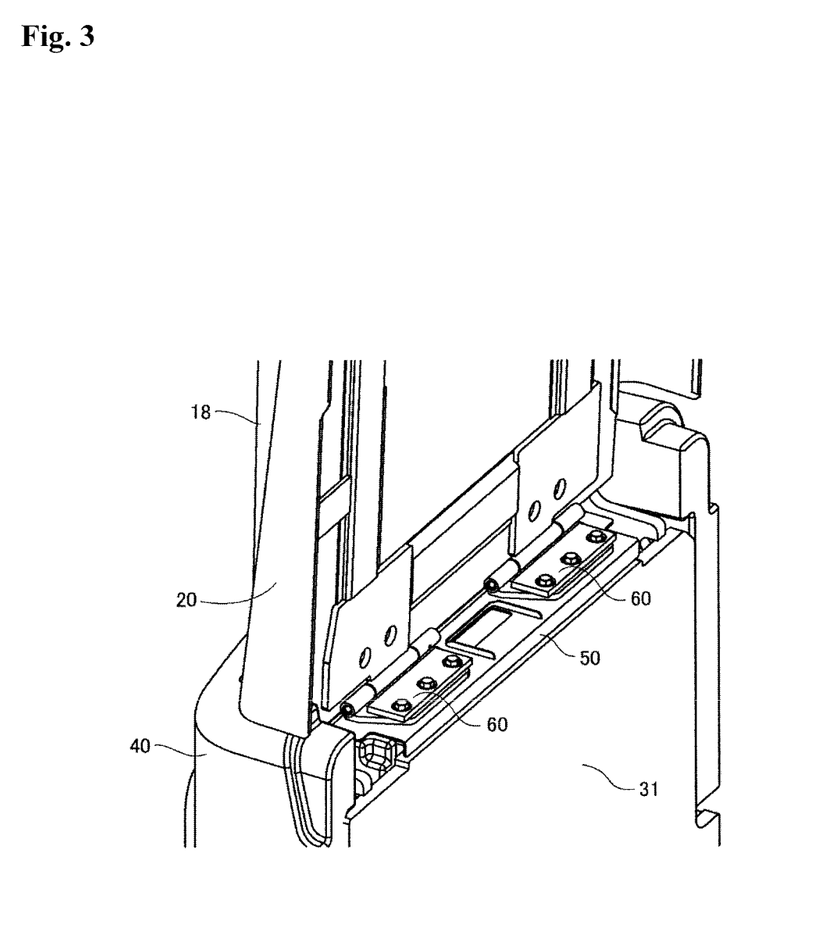
FIG. 3 is an oblique view illustrating the boundary portion between the vehicle body and the counterweight in the forklift according to the embodiment where a battery cover is open.

The battery cover 20 is attached to a frame-side border portion (see the character 32 in FIGS. 5, 6, and 10) provided at an upper edge of the weight attachment plate 31, via hinges 60 and an inner cover 50, as shown in FIGS. 2 and 3. Accordingly, the battery cover 20 can take the above-described two positions, i.e., the position for closing the battery compartment 19 and the flipped-up-backward position.

Figure 4:
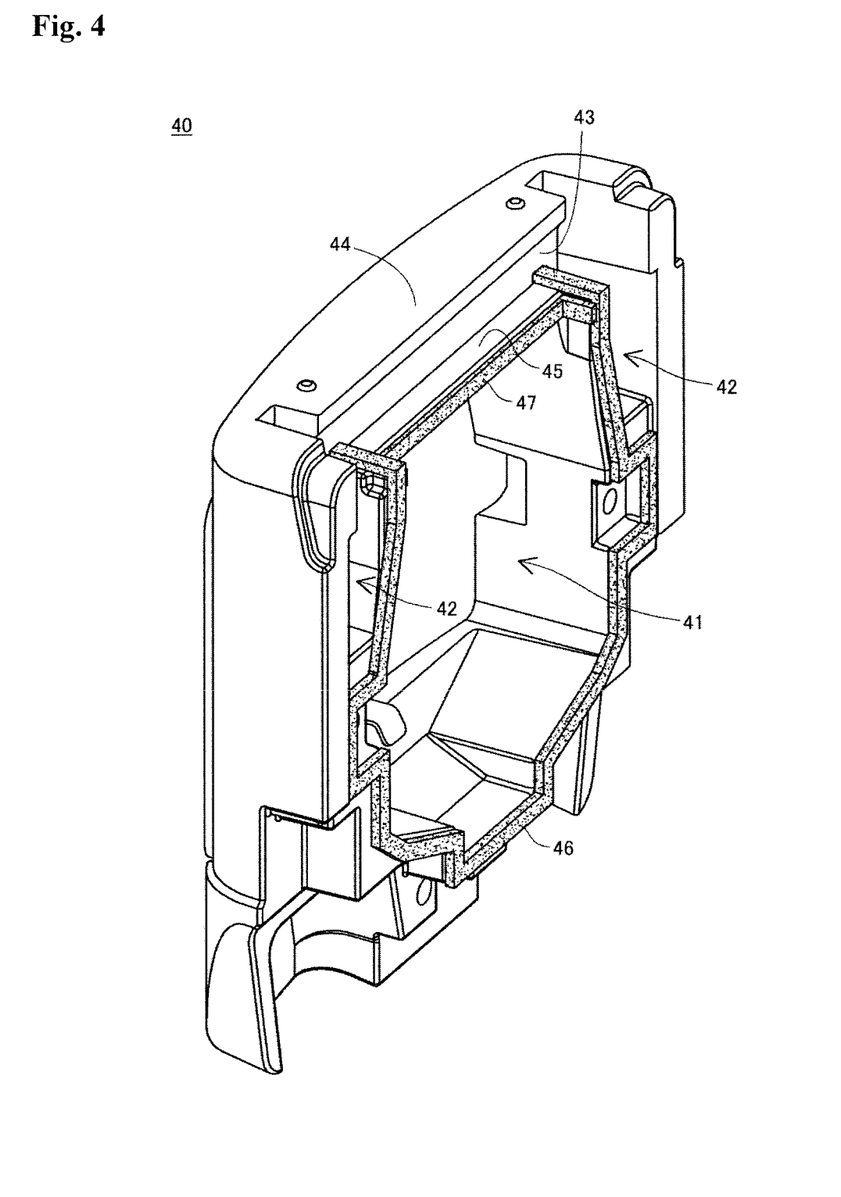
FIG. 4 is an oblique view of the counterweight provided in the forklift according to the embodiment.
Figure 10:
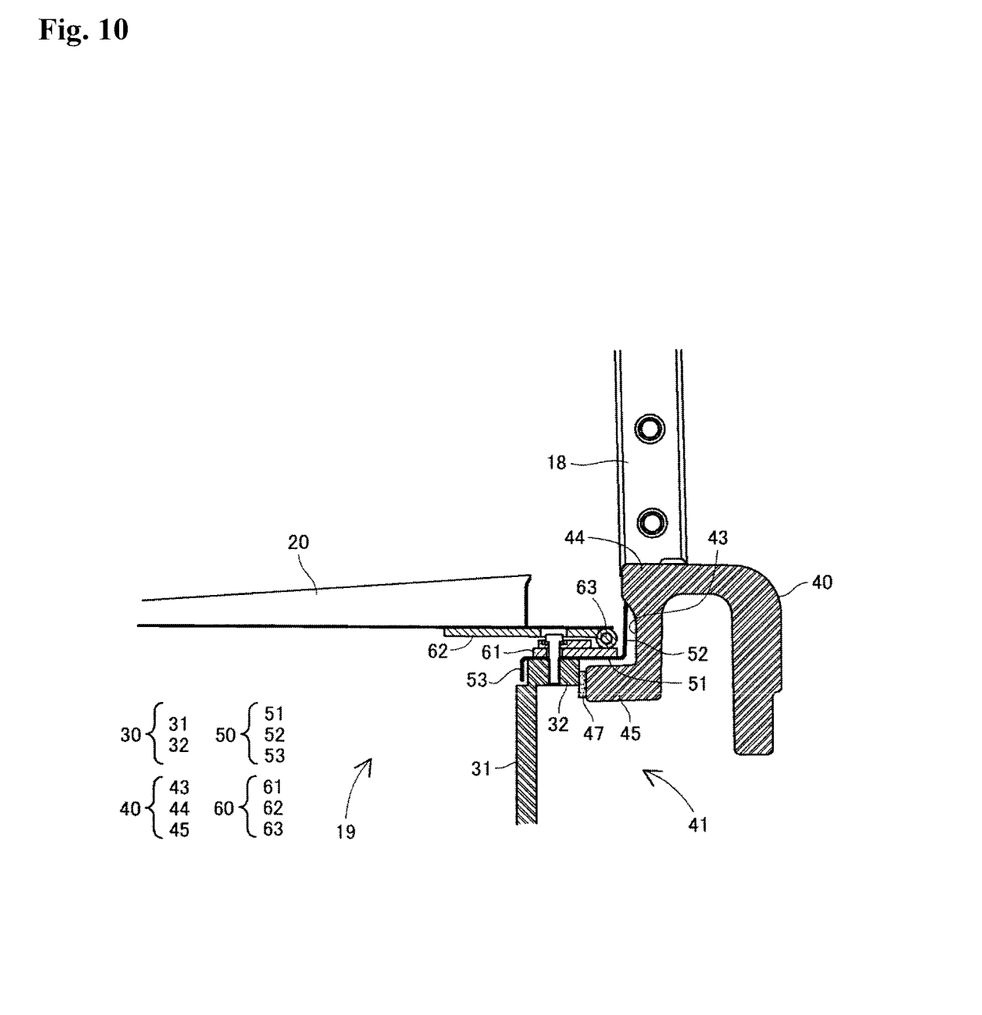
FIG. 10 is a cross-sectional view of the boundary portion between the vehicle body and the counterweight in the forklift according to the embodiment.

The counterweight 40 has an electrical part compartment 41, which is open at the front (the weight attachment plate 31 side), a wall 43 disposed above the electrical part compartment 41, a protrusion 44 projecting slightly forward from the wall 43, and a weight-side border portion 45 projecting from the wall 43 more than the protrusion 44, as shown in FIGS. 4 and 10. Moreover, the electrical pan compartment 41 is enclosed by a peripheral wall (including the weight-side border portion 45), which has a front-end surface on which first and second sealing members 46 and 47, such as sponges, are provided. When the counterweight 40 is attached to the weight attachment plate 31 of the body frame 30, the first sealing member 46 elastically deforms and tightly contacts the weight attachment plate 31, and the second sealing member 47 elastically deforms and tightly contacts the frame-side border portion 32.

The counterweight 40 further has drain chambers 42 disposed to the right and left of the electrical part compartment 41. The drain chambers 42 are open at the front and the top. Moreover, although not shown in FIG. 4, the drain chambers 42 are partially open at the rear in order to discharge incoming rainwater. Note that since the first sealing member 46 is present between the electrical part compartment 41 and the drain chambers 42, rainwater barely leaks out of the drain chambers 42 into the electrical part compartment 41.

Figure 5:
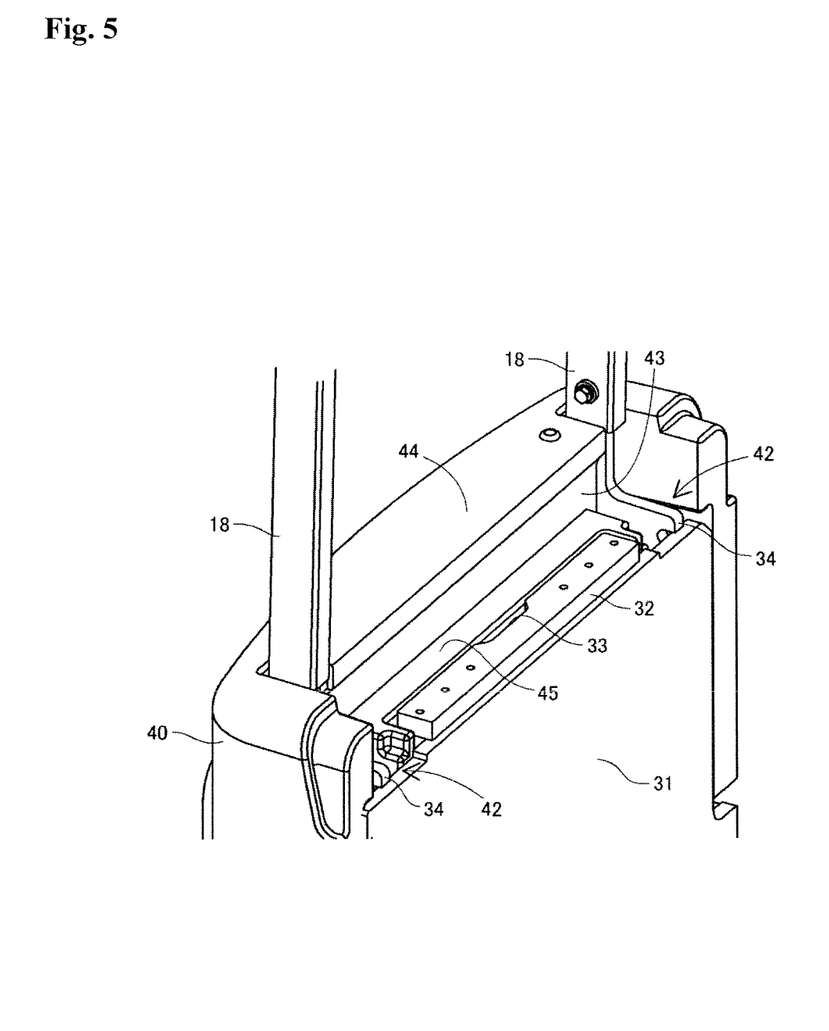
FIG. 5 is an oblique view illustrating the boundary portion between the vehicle body and the counterweight in the forklift according to the embodiment where some members are detached.
Figure 6:
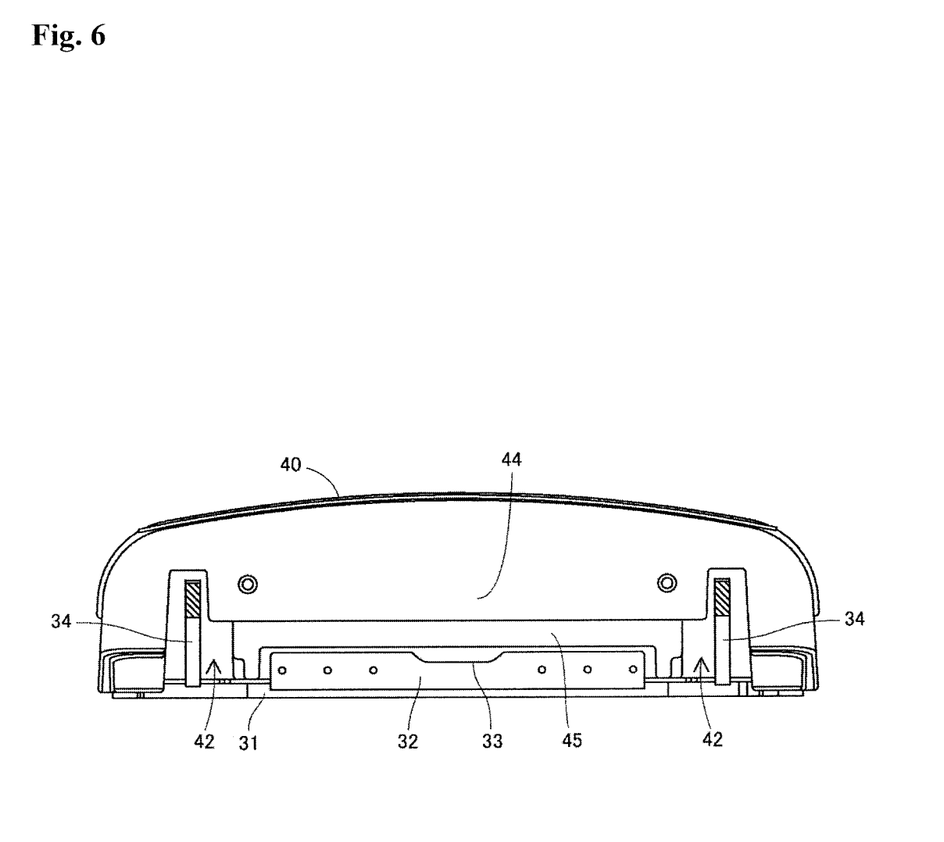
FIG. 6 is a plan view corresponding to FIG. 5.

FIGS. 5 and 6 illustrate a state where the counterweight 40 is attached to the body frame 30 at the back surface of the weight attachment plate 31. Note that in FIGS. 5 and 6, the first sealing member 46 and the second sealing member 47 are omitted.

As shown in these figures and FIG. 10, the body frame 30 has the frame-side border portion 32 attached to the upper edge of the weight attachment plate 31 and having a rectangular shape protruding rearward beyond the back surface of the weight attachment plate 31 when viewed in a plan view. Moreover, the frame-side border portion 32 has a notch 33 formed at a rear edge, and the notch 33 has a trapezoidal shape when viewed in a plan view. The second sealing member 47 fills in a gap between the frame-side border portion 32 and a rectangular recess of the weight-side border portion 45 (see FIG. 10). However, the notch 33 is not completely filled in by the second sealing member 47, leaving some space connecting to the electrical part compartment 41.

The body frame 30 further has pillar attachment portions 34 protruding backward from the back surface of the weight attachment plate 31. In the state where the counterweight 40 is attached to the weight attachment plate 31, the pillar attachment portions 34 are accommodated in the drain chambers 42. The rear pillars 18 described earlier are fixed to the pillar attachment portions 34, as shown in FIG. 5.

Figure 7:
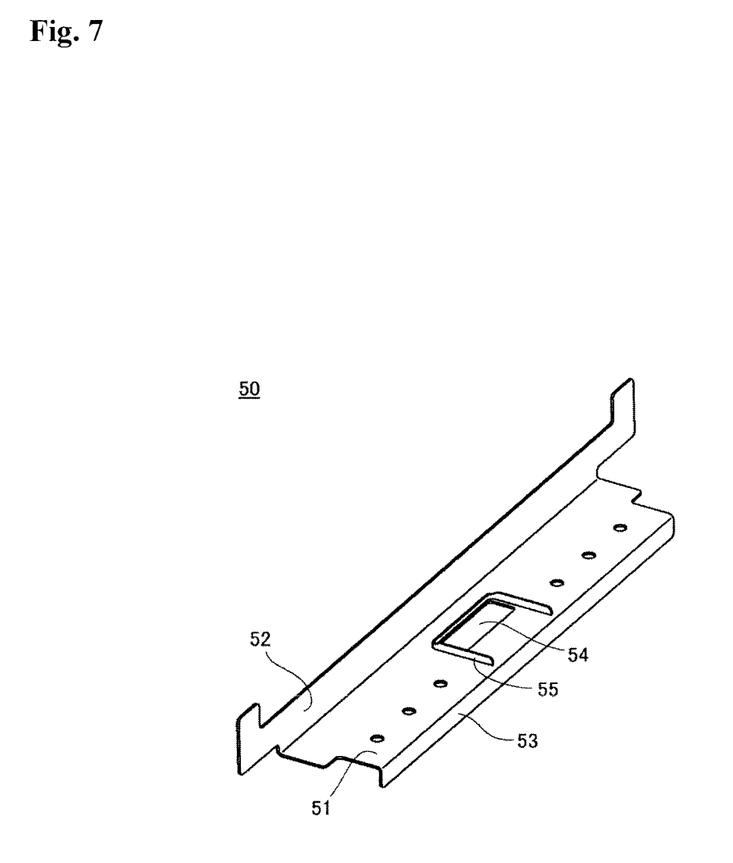
FIG. 7 is an oblique view of an inner cover provided in the forklift according to the embodiment.

The forklift 10 according to the present embodiment further includes the inner cover 50 shown in FIG. 7. The inner cover 50 has a main cover portion 51 disposed so as to extend widthwise beyond a boundary between the frame-side border portion 32 and the weight-side border portion 45, an upward portion 52 directed upward from a rear edge of the main cover portion 51, and a downward portion 53 directed downward from a front edge of the main cover portion 51. Moreover, the main cover portion 51 has an opening 54 provided in a position over the notch 33 formed in the frame-side border portion 32, and a ridge 55 at least partially surrounding the opening 54.

Figure 8:
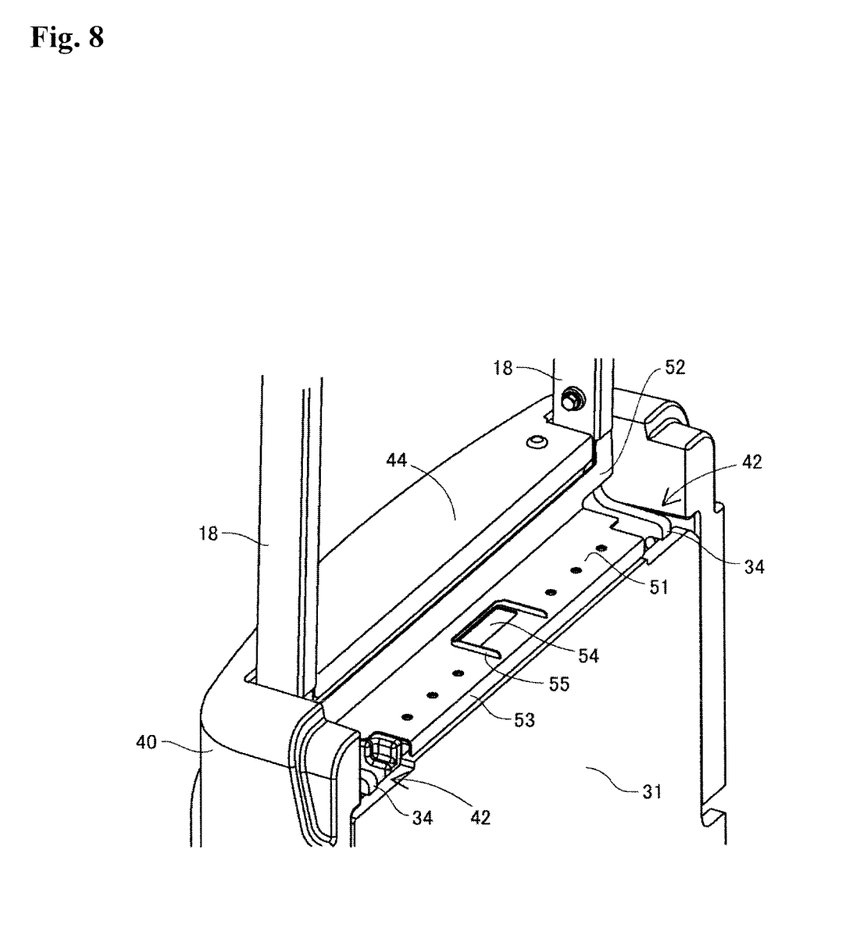
FIG. 8 is an oblique view illustrating the boundary portion between the vehicle body and the counterweight in the forklift according to the embodiment where some members are detached.

FIG. 8 illustrates a state where the inner cover 50 is attached. As can be appreciated from the figure, the boundary between the frame-side border portion 32 and the weight-side border portion 45 is completely covered by the main cover portion 51 of the inner cover 50. Accordingly, the present embodiment renders it possible to reliably prevent even a small amount of rainwater from entering the electrical part compartment 41 through the second sealing member 47 and also renders it possible to achieve a neat appearance. Moreover, the upward portion 52 of the inner cover 50 is disposed in a recess below the protrusion 44 of the counterweight 40 so as to be flush with a front end surface of the protrusion 44 and forward-facing side surfaces of the rear pillars 18 (see FIG. 10). This also contributes to achieving a neat appearance.

The notch 33 of the frame-side border portion 32 and the opening 54 of the main cover portion 51 are utilized for routing cables for electrically connecting internal electrical parts disposed inside the electrical part compartment 41 to external electrical parts (e.g., tail lamps attached to the rear pillars 18) disposed outside the electrical part compartment 41. Moreover, when rainwater flows from the battery cover 20 being flipped up onto the inner cover 50, the ridge 55 of the inner cover 50 plays the role of preventing such rainwater from entering the electrical part compartment 41 through the opening 54 and the notch 33. As a result, the rainwater flowing onto the inner cover 50 is discharged through the drain chambers 42.

The hinge 60 has a frame-side leaf 61, a cover-side leaf 62, and a rotating portion 63 rotatably joins these (see FIG. 10).

Figure 9:
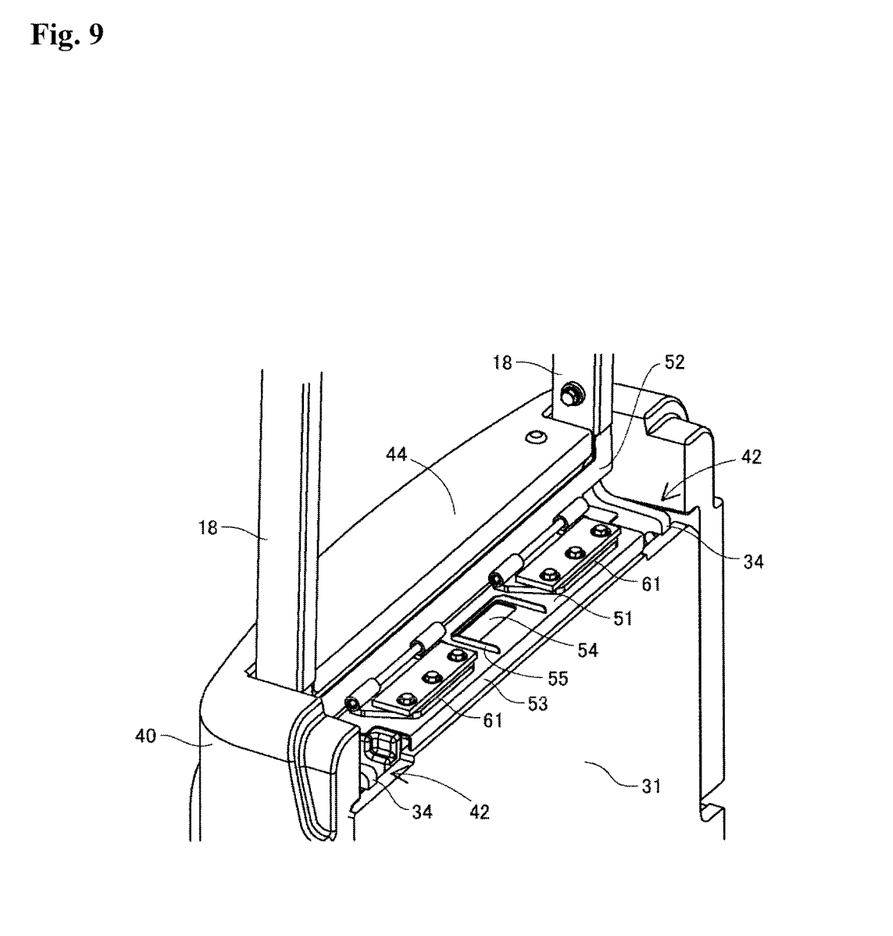
FIG. 9 is an oblique view illustrating the boundary portion between the vehicle body and the counterweight in the forklift according to the embodiment where some members are detached.

FIG. 9 illustrates a state where the frame-side leaf 61, one of the three components of the hinge 60, is attached. As shown in the figure, the frame-side leaf 61 and the inner cover 50 (i.e., the main cover portion 51) are bolted together to the frame-side border portion 32. This attachment task is not performed for a narrow space and therefore can be done effortlessly. Similarly, attaching the cover-side leaf 62 to the frame-side leaf 61 and also the battery cover 20 to the cover-side leaf 62 can be done readily.

While one embodiment of the battery electric forklift according to the present invention has been described above, specific configurations of the present invention are not limited to this, and it is understood that various modifications can be encompassed in such configurations.

DESCRIPTION OF THE REFERENCE CHARACTERS 10 battery electric forklift
11 vehicle body
12 fork
13 mast
14 seat
15 steering wheel
16 overhead guard
17 front pillar
18 rear pillar
19 battery compartment
20 battery cover
30 body frame
31 weight attachment plate
32 frame-side border portion
33 notch
34 pillar attachment portion
40 counterweight
41 electrical part compartment
42 drain chamber
43 wall
44 protrusion
45 weight-side border portion
46 first sealing member
47 second sealing member
50 inner cover
51 main cover portion
52 upward portion
53 downward portion
54 opening
55 ridge
60 hinge
61 frame-side leaf
62 cover-side leaf
63 rotating portion

The invention claimed is:

1. A battery electric forklift comprising a vehicle body, the forklift comprising:
   a body frame forming a battery compartment within the vehicle body;
   an openable battery cover closing the battery compartment;
   a counterweight disposed adjacently behind the body frame;
   forks;
   a mast for raising and lowering the forks, the forks and the mast being disposed in front of the vehicle body;
   a hinge rotatably joining the body frame and the battery cover; and
   an inner cover disposed so as to extend widthwise beyond a boundary between the body frame and the counterweight, wherein,
   the inner cover and the hinge are fastened together to the body frame at a portion forming the boundary.

2. The battery electric forklift according to claim 1, wherein,
   the counterweight has an electrical part compartment with an open front,
   either the body frame or the counterweight, or both, has a notch provided at the portion forming the boundary,
   the inner cover has an opening provided at a portion over the notch and a ridge at least partially surrounding the opening, and
   the notch allows communication between an interior space and an exterior space of the electrical part compartment.

3. The battery electric forklift according to claim 2, further comprising:
   an internal electrical part disposed in the interior space of the electrical part compartment;
   an external electrical part disposed in the exterior space of the electrical part compartment; and
   a cable extending through the notch and electrically connecting the internal electrical part and the external electrical part.

* * * * *